Aug. 30, 1966 S. OSTROW 3,269,474

PIEZOELECTRIC WEIGHTING DEVICE

Filed Aug. 30, 1960 2 Sheets-Sheet 1

INVENTOR
STANLEY OSTROW
BY [signature]
ATTORNEY

INVENTOR
STANLEY OSTROW
BY [signature]
ATTORNEY

United States Patent Office 3,269,474
Patented August 30, 1966

3,269,474
PIEZOELECTRIC WEIGHING DEVICE

Stanley Ostrow, Silver Spring, Md., assignor, by mesne assignments, to Sensonics, Inc., Washington, D.C., a corporation of Delaware Filed Aug. 30, 1960, Ser. No. 52,942
3 Claims. (Cl. 177—211)

My invention relates to a piezoelectric crystal mount which supports the crystal pressure responsively between electrical connectors under preadjusted pressure. More practically, my crystal mount supports the crystal pressure responsively with an electrical lead contact bearing with a preadjusted pressure on one side of the crystal, an opposite side being mounted exposed and sensitive to pressure variations of various types. This preadjusted pressure sensitive mounting of my piezo crystal is useful in several systems to measure pressure variations electrically and accordingly, it can be mounted to measure the pressure of such systems or other variables of a system which can be measured in terms of pressure. My invention further relates, therefore, to combinations of my crystal mount with such systems to measure and sometimes to control the conditions thereof.

In prior mountings of a piezo crystal, the electrical contact with the crystal was either a mechanical or solder junction and the wire body and contact were free to mechanically vibrate at or near the juncture with the crystal. This in itself was a large source of inaccuracy since the output of the crystal is very sensitively responsive to the vibrations which vary the pressure thereon and any vibration particularly of the contacts and lead wires to the crystal is an undesirable variable.

The problem of adequate mounting for accurate use of a piezo crystal is overcome in the present invention by securing the crystal in a housing which leaves one face of the crystal pressure sensitively exposed to ambient or other variable pressure systems including other physical forces converted to pressures and applied to this crystal for measurement, by use of the present crystal mounting. An opposite surface of said crystal has an electrical contact mechanically held thereagainst by threaded support. The threaded support for the contact is of non-conductive or insulated material and adjustably urges the electrical contact against said opposite crystal face. The housing itself in pressure contact with the crystal has a return lead or may be mounted in grounding contact with the system.

With such mount, one face of the crystal remains pressure sensitively exposed and the other face has an electrical connector pressed thereagainst to provide a very accurately controlled pressure. Both connections to the crystal are in themselves insensitive to pressure; the crystal itself has one face held exposed so as to be very highly sensitive to pressure, and the crystal further is held under a preadjusted pressure against its electrical contacts. With such a mount the crystal has one face very highly sensitized to produce any desired electrical output in response to pressure applied to the exposed face, after controllably presetting the crystal pressure against the electrical contact in its mount.

Such controlled sensitive mounting allows the crystal to be used for numerous applications for which it was not heretofore available, or not accurately so.

It is one object of this invention to provide a novel pressure measuring device.

Another object of this invention is to provide a new and improved weighing device.

The invention is further explained by reference to the drawings in which.

Figure 1:
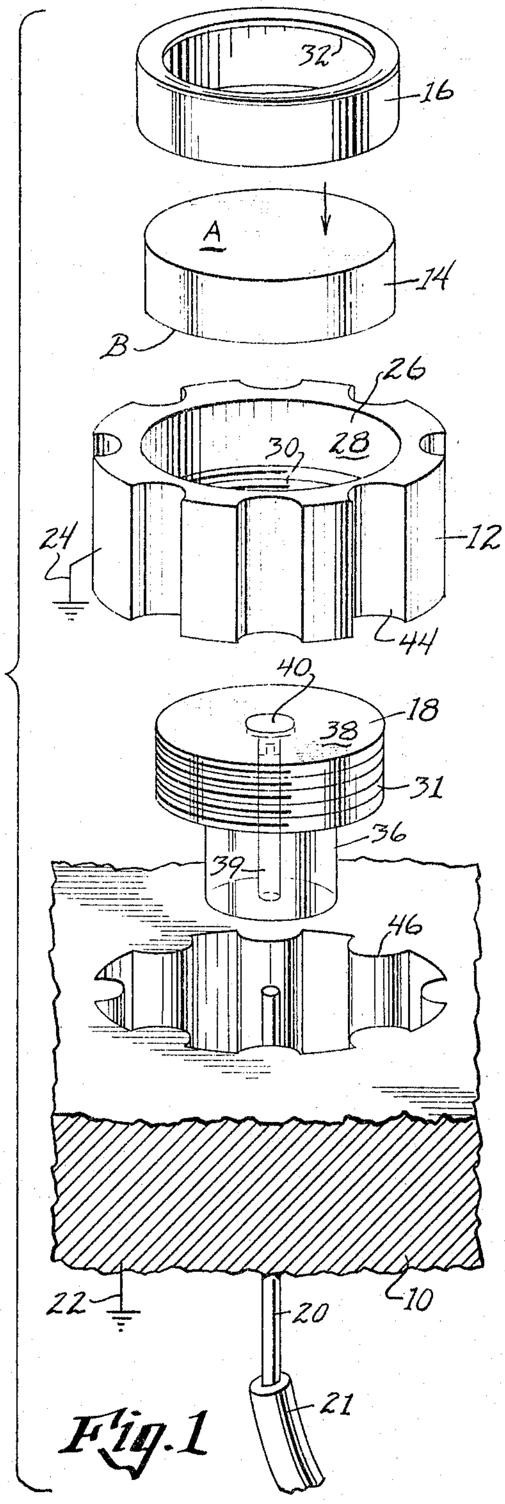
FIG. 1 shows the several disassembled parts of the crystal and mount including a holder, the several parts being arranged in the order in which they would be assembled.

Referring to FIG. 1, the several parts illustrated comprise a supporting body 10 and a crystal receptor or housing 12, a piezo crystal 14, a supporting bushing 16, a torque adjustable non-conductive contact support 18 and an electrical lead wire 20 from which may be stripped some of the insulation 21. The supporting body 10 may be a metal in which case it may be grounded at 22, or if it is not of metal then a grounding lead 24 needs to be attached to the crystal receptor housing 12 to complete the ground circuit.

Figure 3:
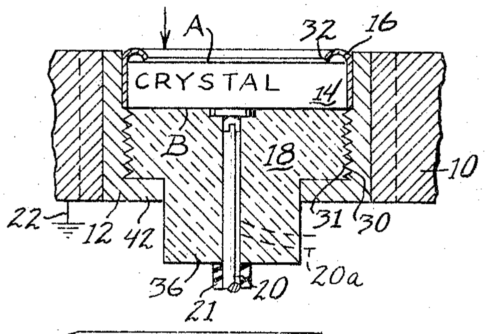
FIG. 3 is an elevation in section through about the center of the assembly taken on the line of about 3—3 of FIG. 2.

The crystal receptor housing 12 is made of conductive or semi-conductive material and is centrally bored at 26 to a smooth upper half surface 28 and a threaded lower half 30. The bushing 16 has an upper flange or lip 32, turned down as shown in FIG. 3, to have a downwardly projecting angular sharp corner. The internal diameter of the ring 16 is sized to slidingly receive the piezo crystal 14 with its upper surface A exposed through the top opening in the ring 16. The outer diameter of the ring 16 is sized to be tightly press-fitted into the annular smooth portion 28 of the bore 26. Thus the bushing 16 is press-fitted in the receptor housing 12, and the crystal 14 is slidingly fitted therein as shown in FIGS. 2 and 3 with its top surface A exposed and with its upper edges held by the upper flange 32.

The contact support 18 is formed of non-conductive material such as hard insulating plastic, and has its outer cylindrical surface 31 threaded to mate with the threads 30 in the lower half of the housing 12. The lower portion of the support 18 continues downward in a projecting boss 36 of smaller diameter than the surface 31 and projects below the mount 12 in assembled position as shown in FIGS. 2 and 3, for purposes which will appear. The central portion of the contact support 18, is axially bored at 39 and has a metal contact member 40 tightly flush fitted in the top surface 38 in the end of the bore 39. A contact lead wire 20 passes upward through and is closely held in the bore 39, and is tightly secured as by soldering or by a set screw (not shown) to the lead contact 40. In this manner the lead 20 and the contact 40 are tightly fitted into the top surface of the non-conductive contact support 18 so as to be substantially integral therewith, but can be adjustably rotated by adjusting the screw thread positions 30 and 31 relative to each other, that is, by rotating the projecting boss. Such rotation adjusts the pressure of the contact 40 against the underside of the crystal 14.

It is not essential, but useful, to have the bottom opening of the mount 12 partially closed by a flange 42 which acts as a stop for the threads 30–31 and determines the lower position of the contact member 18. It is also useful to have the outer annular surface of the housing 12 cut with one or several ribs, splines or keyways 44 which allows the assembled crystal to be inserted and securely held in use by a supporting body 10 which is correspondingly keyed, ribbed or splined at 46 to easily receive the mounted crystal securely fixed therein for immediate use or removal.

Figure 2:
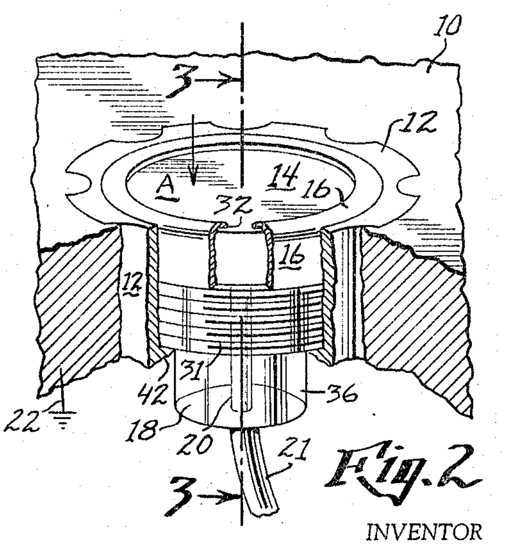
FIG. 2 is a perspective of the assembly with parts broken away and in section to illustrate some internal construction.

In assembling the crystal and its mounting element in a unit such as shown in FIGS. 2 and 3, as described, the contact support member 18 with the contact 40 and wire 20 secured therein, is first assembled into the mount 12 by rotating the threaded portions so that the support 18 is at the lowermost position against the flange 42. The crystal is then inserted into the bushing 16 and the bushing is then press-fitted into the housing 12, close to, but allowing a small clearance between the lower crystal surface B and the top 38 of the contact support 18. Thereafter, the projecting boss 36 is slowly rotatably adjusted, turning the threads 31 with respect to the mating threads 30 of the housing, thereby adjusting the pressure of the contact holder 18 and the contact 40 against the bottom surface B of the crystal 14, and in turn pressing the entire crystal against the contact lip 32 of the ring 16 to a very exact and calibrated contact pressure and consequent electrical output characteristic.

In this matter it will be seen that the crystal is secured under pressure, a rotary torque applied by a new thread adjustment of threads 30 and 31 between the contact 40 bearing against its lower surface and the downturned shoulder or lip portion 32 bearing electroconductively against a small annular margin of the top crystal surface A with most of the upper surface A remaining exposed to ambient pressure. Thus, by rotating the projecting portion 36 of the contact holder, the pressure between the surfaces A and B of the crystal is exactly adjusted and the crystal 14 is securely retained firmly between electroconductive contacts. Moreover, by placing the entire contact mount in a splined or keyed holder 10, it is in place for immediate use ready to supply its calibrated electrical output with exact variation responsive to any pressure variation upon the crystal applied to its exposed surface A in the direction of the arrow.

Figure 4:
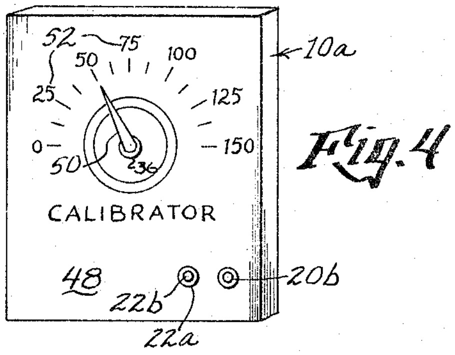
FIG. 4 illustrates a device using the crystal for calibrating.

Such mount has numerous uses. It will be understood as known to one skilled in the art that the electrical output of a piezo crystal varies according to the pressure upon the crystal. The pressure is first applied and adjusted upon crystal 14, with the torque rotation of the contact holder 18 which forces contact 40 against the under side of the crystal increasing its pressure upon the crystal as it is rotated clockwise. For instance, as the boss 36 is grasped and rotated, rotating mating threads 31 within threads 30, the face 38 of the holder and its contact 40 is forced against the underside of crystal 14 with progressingly increasing pressure as it is rotated. If the crystal 14 of FIG. 3, accordingly, is mounted in a holder **10*a*, as shown in FIG. 4, with the boss portion 36 extending and projecting through the plane of the face 48, any clockwise rotation of that boss will, by increasing the pressure on the crystal increase its voltage and/or current output. Conversely, if the boss 36 is rotated counterclockwise, the current output is decreased. A dial position indicator arm 50 may be mounted to the end of the boss 36 as shown. The face 48 of the holder may have marking 52 thereon comprising a dial face. These markings may be positioned and adjusted after suitable calibration to be read in terms of voltage output with variations of pressure on the crystal 14 inasmuch as that pressure will vary with the radial torque position of the indicator 50, with suitable calibration. The indicator 50 will be set in such calibration to accurately point to a dial position indicative of the voltage output of the crystal 14. The lead wire 20 can be taken off through a side of the boss 36 as shown in the dotted line position 20*a* of FIG. 3 for purposes of leading wires behind the face 48 of the holder 10*a*. The lead wire 20, however, could also pass directly through the axis of rotation of indicator 50. The lead wire 20, as shown in FIG. 4, is connected to an insulated binding post 20*b* as an output terminal for the crystal. An input terminal, which may be merely a similar binding post 22*b*, is preferably provided in the same area for purposes of making contact with the housing 12 through a lead wire 24. If the holder material 10*a* is conductive, then the binding post 22*b* may be merely a grounding contact 22*a*. After calibration of the dial settings 52 and indicator arm 50 with respect to the crystal mount position in the holder 10*a*, the entire device is useful as a meter for standardizing or calibrating other electrical devices because its electrical output across terminal 20*b* and 22*b* is readable from the dial position of pointer arm 50**. It is a useful laboratory tool for measuring the electrical conditions of other electrical units. Accordingly, the device shown in FIG. 4, as described, is useful as a standardized electrical output element variable according to its dial setting to a desired electrical output.

Figure 5:
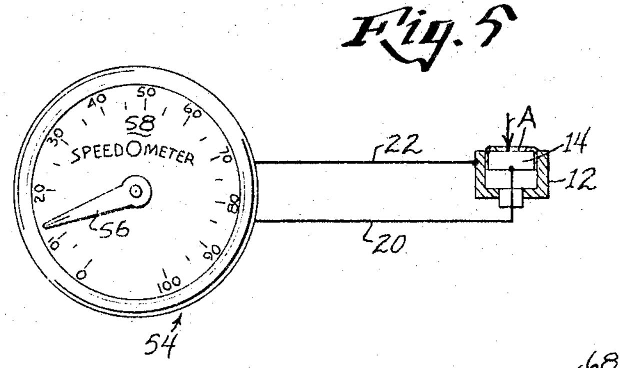
FIG. 5 is a diagram illustrating the use of the crystal combined with a speedometer.

FIG. 5 shows the mounting 12 held in a manner to intercept ambient pressure variations. For instance, the assembly as shown in FIGS. 2 and 3 may be inserted in a forward exposed body portion of a vehicle such as an automobile or in the skin of a missile; it may be mounted in a tank or pipeline to indicate the relatively static as well as dynamic pressure of liquids standing quiescently or flowing therein. Wires 20 and 22 may pass to any voltage or current responsive device which may be a voltmeter or galvanometer, comprising an indicator arm 56 mounted upon a dial face 58, whereby the indicator arm 56 ranges itself in various radial directions pointing to the various positions on face 58, variable with the current generated across lines 20 and 22 by the variable pressure applied to the upper surface A of the crystal 14. The various calibrations of the dial 58 can be modified to read in actual wind velocity whose variations in speed and consequent pressure impart different pressures on the exposed surface A of the crystal 14 to thereby provide a speedometer useful for automobiles or missiles. Obviously the device will indicate static pressures confined in tanks or moving fluid pressures in a pipe. While the dial markings 58 may be calibrated to read in wind velocities, they may be calibrated in any other variables as in ground speeds of a plane or an automobile; or they can be calibrated to read in absolute pressure, such as high or low vacuum pressures.

Figure 6:
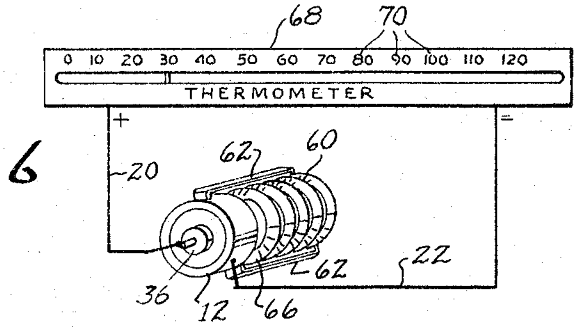
FIG. 6 illustrates a combination of the crystal with temperature expandible bellows to measure temperature.

FIG. 6 shows another modification in which the device is used to measure variable temperatures. For this purpose the crystal holder 12 supports a bellows element 60 which is free to expand or contract with the ambient temperature of any medium in which the device is placed. Two yoke-like arms rigidly fasten the outer end 64 of the bellows to the crystal housing 12. As thus supported, the inner end 66 of the bellows is free to expand or contract toward or away from the exposed crystal face A of the piezo crystal mounted and constructed as in FIG. 3. Since the bellows outer end 64 is held fixedly by the yoke arms 62, any expansion or contraction of the gas in the bellows with temperature variations causes the inner bellows end to bear with a pressure of greater or less degree against the face A of crystal 14. Thus, as the ambient temperature surrounding the bellows 60 varies, it causes greater or lesser pressure to be imparted to the crystal. Consequently, the electrical output of the crystal is caused to vary with temperature. Any suitable electrical indicating device 68 having a dial indicator movable responsive to the electrical output of the crystal will record temperature when the dial markings 70 are calibrated to read in temperature degrees. While a horizontally traversing needle is shown in this figure according to known electrical indicator construction, any electrically responsive indicator such as the dial 54 of FIG. 5 calibrated to read in temperature degrees, could be substituted.

Figure 7:
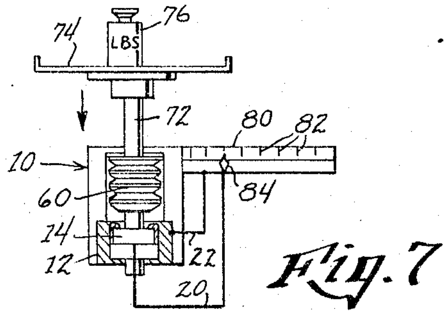
FIG. 7 illustrates the use of the crystal to measure weight.

FIG. 7 is a modification similar to FIG. 6 except that the bellows 60 or other pressure transfer element is mounted vertically to transfer pressure downward in the direction of the arrow against the face A of crystal 14 supported calibratedly under pressure as described above in a mounting 12 so that the downward pressure of any force transferring element 72, which is shown here as merely a vertical rod, resiliently bears against the face of the crystal A. The bellows 60 in this instance, can be replaced with a spring, or other resilient member which can transfer pressures to the face of the crystal accurately, but without damage. A pan 74 of a scale may be mounted normal to the rod 72 to receive various weight elements 76 thereon. The variable weights in terms of various gravity pressures applied to the crystal 14 will vary its output through conductors 20 and 22. These are hooked up to any electrical measuring device 80 having a dial 84 which will indicate on the scole 82 the quality of the current and/or voltage generated by the crystal 14, responsive to weight or pressure being applied to the crystal, such weight applied by way of arm 72; that is, any variation of the weight 76 will cause the electrical indicator 84 to assume a corresponding position on the calibrated dial markings 82 to read in terms of weight. Accordingly, to adapt the electrical crystal element hereof to a scale to measure weights, it is necessary only to calibrate the markings 82 to correspond to pounds, ounces or grams, whichever is to be measured. Other electro-responsive units such as 68 of FIG. 6, or 54 of FIG. 5, suitably calibrated to elements of weight could be used instead of the indicator 80.

As thus described, an improved piezo crystal mount is provided which has by torque adjustment a preset pressure of crystal contacts upon the crystal, thereby providing adjustably firm controlled pressure of the electrical contacts upon the crystal. No inaccuracies develop upon the use of this crystal due to stresses upon the crystal contacts. At the same time, the absolute pressure and output of the crystal is adjustably set. This type of mount lends itself to numerous uses requiring an accurately preset pressure, the output conditions of the crystal indicating ambient pressures or velocity pressures thereby being useful to measure the pressure on stationary bodies or the velocity of moving bodies.

I claim:

1. A pressure measuring device comprising a piezo electric crystal supported in a crystal mount with one face of said crystal upwardly exposed, an electrical indicating device in circuit with the output current of said crystal, measuring the output current produced by said crystal responsive to pressure applied to said exposed face, a pressure transfer means resiliently contacting the pressure responsive exposed face of said crystal at its lower end, a pan fastened upon the upper end of said pressure transfer means upon which objects to be weighed are placed said electrical indicating device having a dial calibrated in terms of units of weight whereby the weight of various bodies placed on said pan is measured.

2. The weighing as defined in claim 1 in which the resilient contacting means for transfering weight pressure to said crystal face comprises a bellows.

3. A weighing device comprising a piezo crystal supported in a mount comprising a conductive housing securing and supporting the piezo crystal with a face portion of the crystal body pressure responsively exposed, a non-conductive contact support having an electrical contact firmly secured therein, said contact support being adjustably fastenable in said conductive housing with its electrical contact insulated from said housing and adjustably bearing in electroconductive contact against a surface of said crystal opposite to said exposed face portion, an electrical indicating device in circuit with the output current of said crystal indicating the electrical condition of said crystal responsive to the pressure upon its exposed face portion, a pressure transfer means having a lower output end resiliently supported upon the pressure responsive exposed face portion of said crystal, a pan fastened upon the upper end of said pressure transfer means upon which objects to be weighed are placed, said electrical indicator device having a dial calibrated in terms of units of weight whereby the weight of various bodies placed on said pan is measured.

References Cited by the Examiner

UNITED STATES PATENTS

| | | | |
|---|---|---|---|
| 2,006,558 | 7/1935 | Mueller | 73—359 |
| 2,030,523 | 2/1936 | Keller | 73—205 |
| 2,081,367 | 5/1937 | Nicolson | 177—210 |
| 2,081,862 | 5/1937 | Williams | 310—8 |
| 2,128,215 | 8/1938 | Walker | 33—169 |
| 2,164,638 | 7/1939 | Broeze et al. | 73—398 X |
| 2,573,596 | 10/1951 | Offner | 73—359 |
| 2,689,408 | 9/1954 | Cornell et al. | 33—169 |
| 2,713,796 | 7/1955 | Herndon | 73—398 |
| 2,756,353 | 7/1956 | Samsel | 310—8 |
| 2,788,664 | 4/1957 | Coulbourn et al. | 73—398 |
| 2,914,310 | 11/1959 | Bahrs | 177—210 |

FOREIGN PATENTS

| | | |
|---|---|---|
| 457,295 | 11/1936 | Great Britain. |

RICHARD C. QUEISSER, *Primary Examiner.*

ROBERT L. EVANS, JOSEPH P. STRIZAK, *Examiners.*

L. G. ARON, CHARLES A. RUEHL, *Assistant Examiners.*